United States Patent
Bhogal et al.

(10) Patent No.: US 9,794,692 B2
(45) Date of Patent: Oct. 17, 2017

(54) MULTI-CHANNEL SPEAKER OUTPUT ORIENTATION DETECTION

(71) Applicant: International Business Machines Corporation, Armonk, NY (US)

(72) Inventors: Kulvir S. Bhogal, Fort Worth, TX (US); Jonathan F. Brunn, Logan, UT (US); Jeffrey R. Hoy, Southern Pines, NC (US); Asima Silva, Holden, MA (US)

(73) Assignee: International Business Machines Corporation, Armonk, NY (US)

(*) Notice: Subject to any disclaimer, the term of this patent is extended or adjusted under 35 U.S.C. 154(b) by 80 days.

(21) Appl. No.: 14/701,136

(22) Filed: Apr. 30, 2015

(65) Prior Publication Data

US 2016/0323672 A1 Nov. 3, 2016

(51) Int. Cl.
| H04R 29/00 | (2006.01) |
| H04R 5/04 | (2006.01) |
| H04S 7/00 | (2006.01) |
| G06F 1/16 | (2006.01) |
| H04R 3/00 | (2006.01) |

(52) U.S. Cl.
CPC .............. *H04R 5/04* (2013.01); *H04S 7/301* (2013.01); *G06F 1/163* (2013.01); *H04R 3/00* (2013.01); *H04R 2420/07* (2013.01); *H04R 2499/11* (2013.01)

(58) Field of Classification Search
CPC H04M 1/605; H04R 5/04; H04R 5/02; H04R 29/00; H04R 1/32
USPC ......... 455/569.2; 381/1, 309, 59, 74, 81, 58, 381/123
See application file for complete search history.

(56) References Cited

U.S. PATENT DOCUMENTS

| 2011/0316967 | A1* | 12/2011 | Etter | H04N 7/142 348/14.16 |
| 2012/0114154 | A1* | 5/2012 | Abrahamsson | H04R 5/033 381/309 |
| 2013/0216052 | A1 | 8/2013 | Bruss et al. | |
| 2014/0079238 | A1 | 3/2014 | Bastide et al. | |
| 2014/0133657 | A1* | 5/2014 | Xu | H04R 5/04 381/1 |
| 2014/0254817 | A1* | 9/2014 | Vilermo | H04R 1/32 381/74 |
| 2014/0329567 | A1* | 11/2014 | Chan | H04M 1/605 455/569.2 |

\* cited by examiner

*Primary Examiner* — Vivian Chin
*Assistant Examiner* — Ubachukwu Odunukwe
(74) *Attorney, Agent, or Firm* — DeLizio Law, PLLC (57) ABSTRACT

A method is disclosed for determining a relative orientation of speakers that receive audio signals from a portable audio source device. In an embodiment, a microphone coupled with the portable audio source device receives a first sound from a first speaker and a second sound from a second speaker. An orientation detector determines a volume of at least one of the first and second sounds and the portable audio source device detects a movement of the portable audio source device. The orientation detector detects a variation in the determined volume and determines a relative orientation of the first and second speakers based, at least in part, on the detected movement and the detected variation in the determined volume.

11 Claims, 6 Drawing Sheets

MULTI-CHANNEL SPEAKER OUTPUT ORIENTATION DETECTION

BACKGROUND

Embodiments of the inventive subject matter generally relate to the field of portable audio devices, and, in particular, to determining the relative orientation of earpiece speakers with respect to a portable audio device.

Portable computer devices such as media players, smart phones, tablets, etc., enable users to view and listen to media content such as movies, video games, music, and so forth, in which the use of earphones/earpieces can facilitate the output of corresponding audio content on an individualized basis. To enhance the listening experience, the left and right earpieces carry distinct left and right audio channels of the audio content generated by an audio source device. The differing left and right channel audio content is particularly significant depending on the type of media being generated (e.g., video displaying directional scenes). Therefore, placement of the left and right earpiece in or on the correctly corresponding ear of the user is significant in terms of enjoyment of entertainment media, and may also have safety implications, such as when a machine or vehicle operator utilizes and depends on different communication signal (e.g. input from different sources) customarily received in the same left/right receiver orientation.

Visible left-right identifiers are widely used to assist a user in correctly orienting the earpieces. However, such visible markers can be unavailable in the case of wireless, miniaturized earpieces, indicators may be otherwise inconvenient or impractical such as in low-light environments, or earpiece design may not allow for quick manual left-right orientation interchangeability.

SUMMARY

A method is disclosed for determining a relative orientation of speakers that receive audio signals from a portable audio source device. In an embodiment, a microphone coupled with the portable audio source device receives a first sound from a first speaker and a second sound from a second speaker. An orientation detector determines a metric of at least one of the received first and second sounds and the portable audio source device detects a movement of the portable audio source device. The orientation detector detects a variation in the determined metric and determines a relative orientation of the first and second speakers based, at least in part, on the detected movement and the detected variation in the determined metric.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
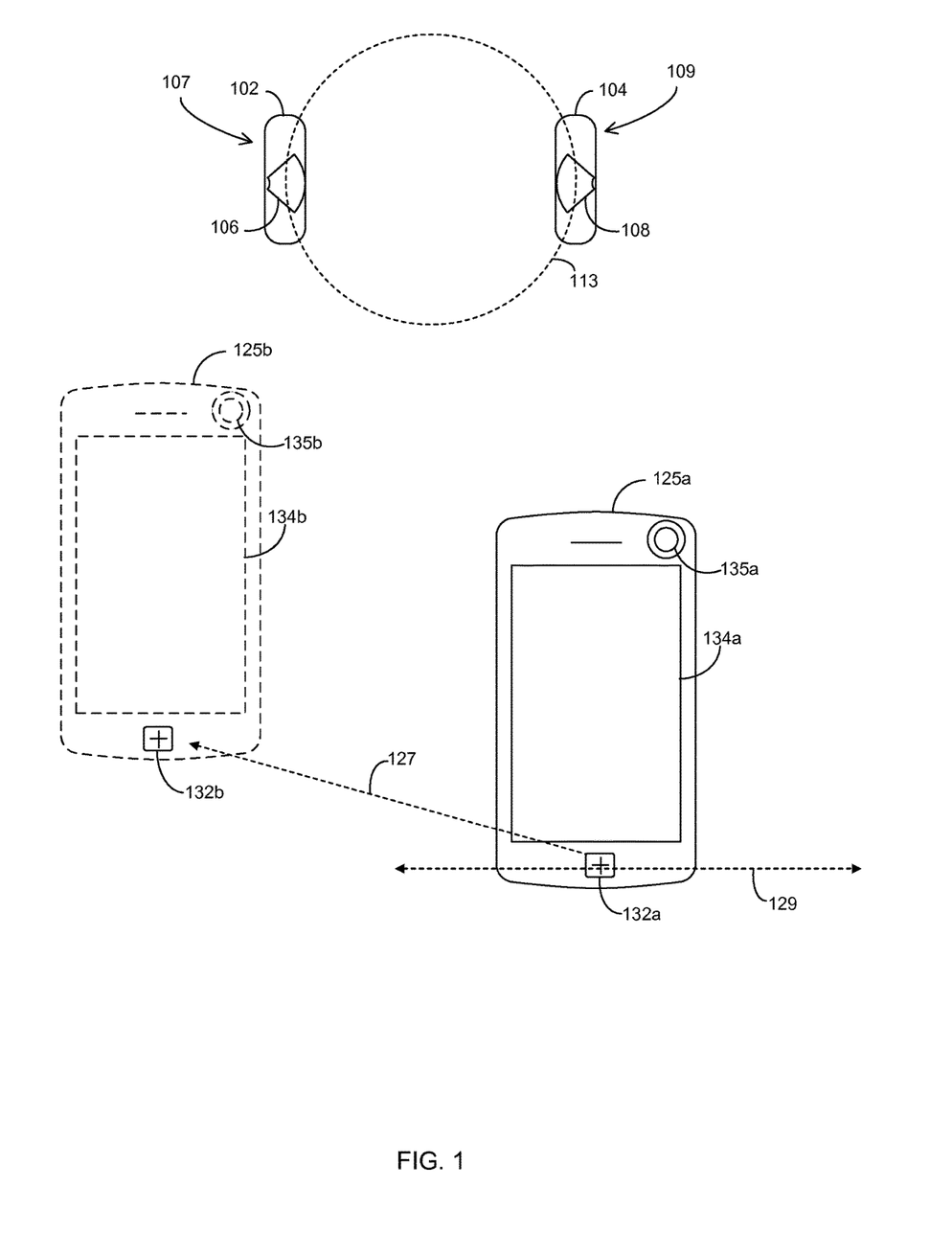
FIG. 1 is a high-level system diagram depicting implementation of a speaker orientation detection system in accordance with an embodiment.

FIG. 1 is a high-level system diagram depicting implementation of a speaker output orientation detection system in accordance with an embodiment. The system depicted and generally described with reference to FIG. 1 may be utilized for performing one or more of the functions and operations described with reference to FIGS. 2-5. While FIG. 1 illustrates one example detection system configuration, other configurations may also be utilized to implement other embodiments of the present invention.

The depicted detection system includes a portable audio source device in the form of a smartphone 125 that transmits audio signals to a pair of earpieces 107 and 109. For ease of illustration and description, earpieces 107 and 109 are depicted from an overhead perspective. Earpieces 107 and 109 may respectively comprise right and left earpieces of a headphone or individually affixed earphones or earbuds. Each of earpieces 107 and 109 may comprise matching assemblies of one or more components/devices electrically and/or structurally combined to facilitate positioning of relatively small audio speakers with respect to a user's ears. Earpiece 107 includes a right-hand speaker (right speaker) 106 mounted within or otherwise attached to an ear pad 102. Similarly, earpiece 109 includes a left-hand speaker (left speaker) 108 mounted within or otherwise attached to an ear pad 104. Ear pads 102 and 104 provide a physical contact interface for mounting earpieces 107 and 109 onto a user's ears in a manner such that sound from each of speakers 106 and 108 are optimally directed.

Right and left speakers 106 and 108 may comprise specialized or general-purpose audio output devices and components. Typically, speakers 106 and 108 comprise transducers that convert electrical audio signals into sound waves. Speakers 106 and 108 receive input audio signals from a portable audio source device such as smartphone 125 in the depicted embodiment. The input audio signals may be an audio modulated RF signal received over a wireless interface. Alternately, the audio signal input may be an audio modulated wireline signal.

Related to the right/left designation of speakers 106 and 108, the input audio signal received by speaker 106 may be different than the signal received by speaker 108. For example, the audio signals received by speakers 106 and 108 may be complementary, right and left, stereo channel signals. The respective sounds generated by speakers 106 and 108 are determined by the modulation encoding of the input audio signals and characterized by frequency and amplitude of the sounds resulting from the converted input signals. The frequency determines sound pitch and the amplitude determines loudness. Depending on the nature of the mounting apparatus (e.g., headphone or earbuds), speakers 106 and 108 may be active speakers that include local amplification control or may be passive speakers, that rely on signal source amplification by an audio source device, such as smartphone 125.

In the depicted embodiment, smartphone 125 may comprise several features for receiving and processing information such as from a user input interface and/or from a network interface. Smartphone 125 typically comprises memory and processor components for storing and processing received information such as stored audio files or audio signals received from a network interface. Smartphone 125 further includes components and devices for displaying, transmitting, or otherwise outputting information and signals. For example, smartphone 125 comprises an input/output (I/O) screen 134 on which images, such as video presentations, can be visually displayed. I/O screen 134 may further display user selectable objects that can be used to receive user input to be processed by smartphone 125.

As depicted and described in further detail with reference to FIG. 2, smartphone 125 further includes a connectivity interface for transmitting audio signals to each of speakers 106 and 108. The connectivity interface may be an RF interface such as a Bluetooth® interface. Alternately, the interface may be a wireline interface that physically couples speakers 106 and 108 with smartphone 125. In an embodiment, the connectivity interface of smartphone 125 receives audio signals from an internal audio signal processor that generates a multi-channel audio signal, such as a stereo signal having a designated "right" channel and a designated "left" channel. In such a configuration, the right channel signal is transmitted to right speaker 106 and the left channel signal is transmitted to left speaker 108. The right/left separation is significant for many audio and audio-visual presentations for which a user may be watching a visual presentation on smartphone 125 while wearing earpieces 107 and 109. For example, the user may be watching a video presentation displayed on I/O screen 134 while listening to associated audio (e.g., an accompanying sound track) from speakers 106 and 108. The stereo effect of different sound signals from each of speakers 106 and 108 contributes a surround effect to the audio and may improve perceived correlation of sounds associated with left-to-right or right-to-left image sequences displayed on I/O screen 134.

As depicted in FIG. 1, earpieces 107 and 109, and hence speakers 106 and 108, are typically deployed in laterally opposed, left/right positions when worn on a user's right and left ears. The depicted system further includes components, elements, and logic features that detect the relative horizontal orientation (e.g., left/right orientation) of the system-designated right and left speakers (e.g., speakers 106 and 108) with respect to the position of an audio source device (e.g., smartphone 125). By detecting the relative orientation with respect to audio source position, and accounting for the position of the audio source device with respect to a user, the relative orientation of the right and left speakers with respect to a user's right-hand side and left-hand sides can be determined.

The system can determine whether the system-designated right speaker (e.g., speaker 106) has been positioned on or proximate to a user's right-hand side (e.g., on right ear) and whether the system-designated left speaker (e.g., speaker 108) has been positioned on or proximate to a user's left-hand side (e.g., on left ear). In an embodiment, the system may determine that the designated left and right speakers are correctly or incorrectly oriented based, in part, on detected changes in signal strength and/or frequency of sounds received from one or both of speakers 106 and 108. In an embodiment, the relative orientation of speakers 106 and 108 may be determined based, in part, on a detected movement of smartphone 125 in association with the detected changes in sound metrics that are influenced by relative motion between smartphone 125 and speakers 106 and 108 such as volume gains or fades and Doppler frequency shifting.

The depicted embodiments include several features that may facilitate determining correct or incorrect right/left speaker orientation. In an embodiment, the system includes devices and components that detect and identify audio signatures of audio channels respectively output from each of a left and a right speaker. The system may leverage identified audio signatures and corresponding signal strengths and/or frequencies to determine relative proximity and changes in proximity of an audio source device to one or both of a left and a right speaker. In the depicted embodiment, the system includes a sound sensor in the form of a microphone 135 coupled to or otherwise fixedly integrated with smartphone 125. Microphone 135 may comprise an electro-mechanical sensor that converts sound waves into audio-encoded electrical signals. Microphone 135 receives sounds from either or both of speakers 106 and 108 and transmits corresponding individual or combined audio signals to a control unit (not depicted in FIG. 1). As depicted and explained in further detail with reference to FIGS. 2 and 3, the control unit processes the audio signals to detect respective right/left audio channel signatures that may be utilized in combination with corresponding changes in volume and/or frequency to determine relative proximity and/or changes in relative proximity of smartphone 125 to one or both of speakers 106 and 108.

Smartphone 125 further comprises a motion sensor 132 that detects movements of smartphone 125. For example, motion sensor 132 may comprise an accelerometer that may detect motion of smartphone 125 in a variety of linear and/or angular tracks such as tracks 127 and 129. Motion data generated by motion sensor 132 may be continuously, intermittently, or otherwise selectively processed by a general purpose processor or specialized detector within smartphone 125. The motion data may be correlated with detected signal strength variations from speakers 106 and 108 to determine a relative orientation of speakers 106 and 108.

Figure 2:
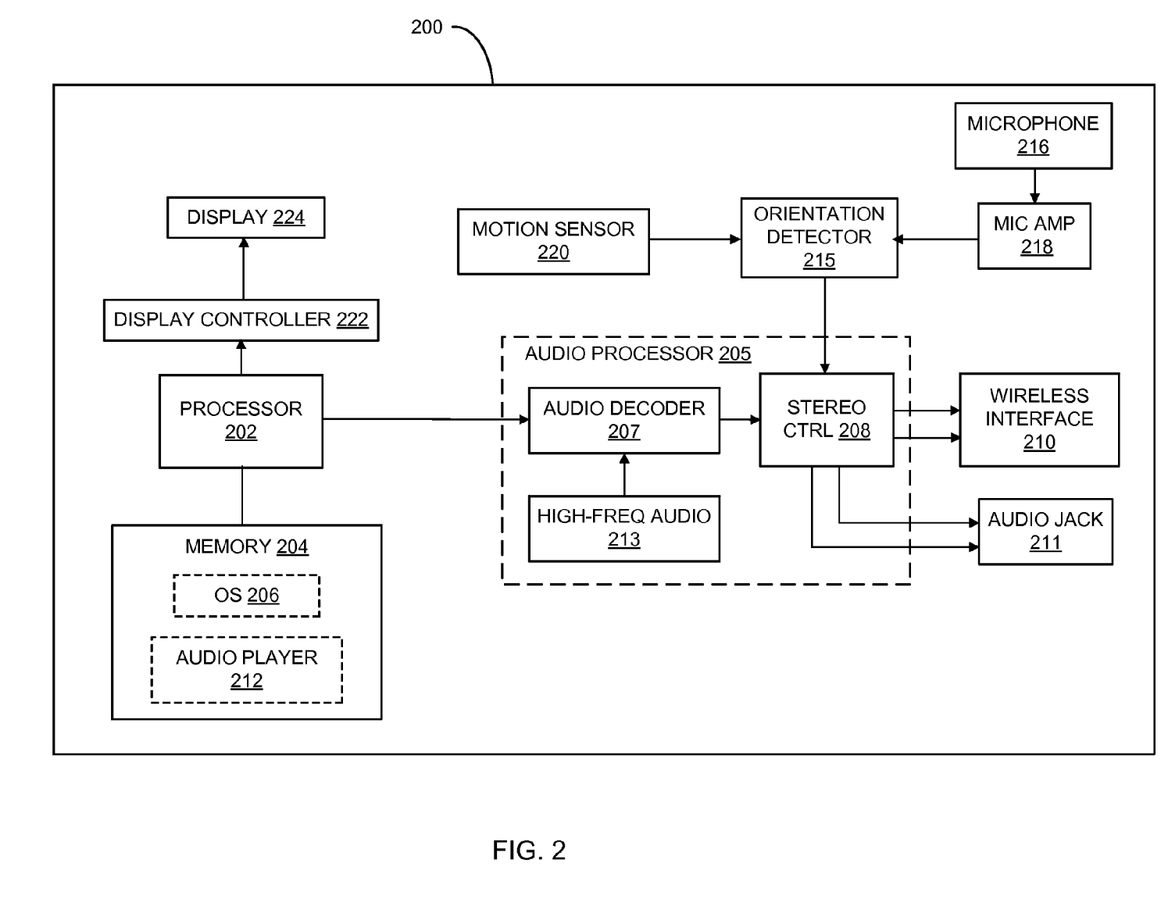
FIG. 2 is a block diagram illustrating a portable audio source device implementing a speaker orientation detection system in accordance with an embodiment.

FIG. 2 is a block diagram illustrating a portable audio source device 200 implementing a speaker orientation detection system in accordance with an embodiment. Audio source device 200 may be a smartphone or other handheld communication and processing device that processes and transmits audio signals to a pair of external speakers such as speakers 106 and 108 in FIG. 1. Audio source device 200 comprises components and devices including a host processor 202 and a system memory 204 which cooperatively function to manage various system-level and application-level programs and data that enable device 200 to perform various data input/output (I/O), signaling, and processing tasks associated with audio and/or multimedia applications.

System memory 204 stores application programs, such as an audio player application 212, as well as system programs and supporting data that control operations of device 200. The system software stored within system memory 204 includes an operating system (OS) 206 that coordinates activities among hardware components and utility program software that performs system management tasks. OS 206 may be a flexible, multi-purpose OS such as the Android OS found in smartphones, or may be an embedded OS having more specialized functions such as may loaded within a minimal form factor audio device. OS 206 generally comprises code for managing and providing services to hardware and software components within device 200 to enable program execution. Among other code and instructions, OS 206 includes process management code comprising instructions for interfacing application code with system hardware and software. OS 206 may further include memory management code for allocating and managing memory for use by application and system-level programs. OS 206 further includes I/O system management code including device drivers that enable the system's hardware to communication with external computer systems.

Audio source device 200 further comprises a display 224 and a display controller 222 that operationally interfaces processor 202 with display 224. Audio source device 200 also includes an audio processor 205 that receives, processes and/or generates electrical audio signals and transmits output audio signals to a pair of external speakers (not depicted in FIG. 2) via an audio output interface such as a wireless interface 210 or an audio output jack 211. For example, audio processor 205 may receive input audio data from processor 202 during execution of audio player application 212. In the depicted embodiment, audio processor 205 includes an audio decoder 207 that receives audio data such as from processor 202. Audio decoder 207 decodes received audio data, such as by, for example, decompressing compressed audio data formats such as MPEG 3 compressed data. Audio decoder 207 outputs the decoded audio signal data to a stereo controller 208 which multiplexes the data to generate multichannel stereo signals (i.e., right and left channels) that are respectively sent as right and left channel signals to a wireless interface 210 and/or an audio jack 211. Wireless interface 210 and audio jack 211 are configured so that the right channel signal from stereo controller 208 is transmitted to the system-designated right speaker and the left channel signal is transmitted to the system-designated left speaker.

In addition to components for generating and transmitting right and left channel signals to right and left speakers, audio source device 200 includes components and logic for detecting the orientation of the system-designated right and left speakers relative to audio source device 200. Typically, the relative orientation of the right and left speakers is determined in accordance with a lateral, side-to-side arrangement of the speakers relative to audio source device 200. In an embodiment, the relative orientation may be detected by an orientation detector 215 using a combination of sound input received by the speakers and detected motion of audio source device 200.

In the depicted embodiment, the sound input is received by a microphone 216 that is integrated with or otherwise coupled with audio source device 200. During audio signal processing, such as playing audio player 212, microphone 216 receives the sounds generated by one or both of the external right and left speakers. Microphone 216 may be an ultra-sensitive multi-directional sensor that sends the resultant electrical audio signals for amplification by an amplifier 218 before being received by orientation detector 215. The device components further include a motion sensor 220 integrated with audio source device 200. Motion sensor 220 detects linear and/or angular motion audio source device 200 such may result from a user moving the device by hand (e.g., incidental hand motion, switching device between hands, intentionally swinging the device laterally). For example, motion sensor 220 may be an accelerometer that detects directional acceleration of audio source device 200. Motion data generated by motion sensor 220 may be continuously, intermittently, or otherwise selectively processed by orientation detector 215. The motion data may be correlated with detected changes in volume and/or frequency of the sounds received from the right and left speakers to determine a relative orientation of the speakers.

In one embodiment, the received sounds are generated during regular processing of audio signals such as originating from audio player 212. As depicted and described in greater detail with reference to FIGS. 3-5, the signals from each of the right and left speakers may be distinct, right/left, audio signals that are identified by the system to facilitate speaker orientation detection. The orientation of the receiver device is also used in calculation. For example, if a smartphone is facing the user its particular orientation would be different than if the smartphone is in the user's pocket. Audio analysis is relative to the user's head position, and so spatial normalization can be used to determine the relative position of the microphone receiver. In some embodiments, the sounds from the speakers may be substantially indistinguishable. In such cases, a high-frequency signal source 213 may be utilized to provide a high-frequency, inaudible signal to the audio processing components which forward the signal to one or the other of the right and left speakers. In this embodiment, the high-frequency sounds may be sent to only one or the other or may be sent alternately between the right and left speakers. The orientation detection system may utilize the distinct resultant sound received at the microphone to identify the speakers.

Figure 3:
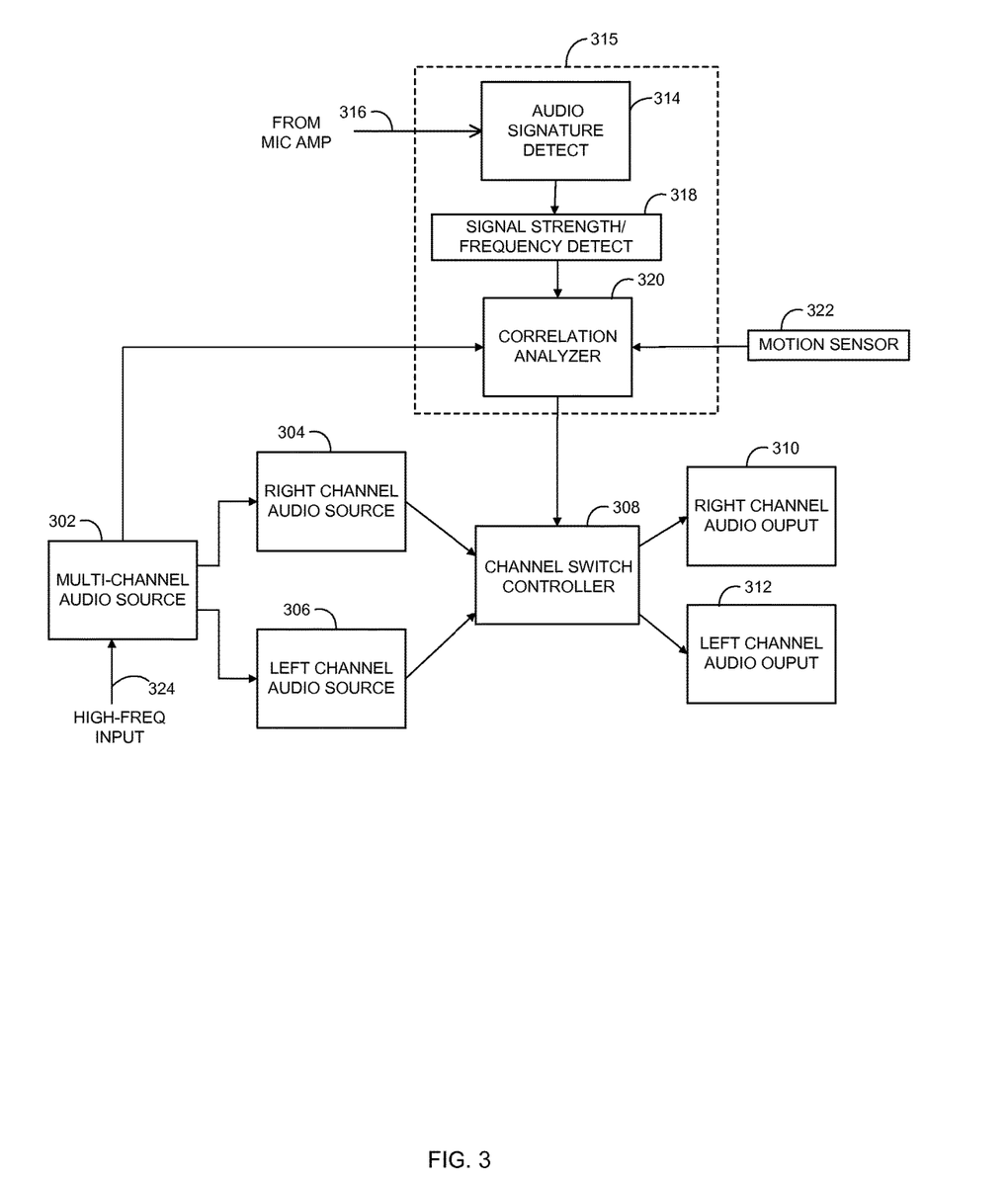
FIG. 3 is a block diagram depicting hardware and software devices and modules included within a speaker orientation detection system in accordance with an embodiment.

FIG. 3 is a block diagram depicting hardware and software devices and modules included within a speaker orientation detection system in accordance with an embodiment. The system may be implemented from a portable audio source device such as illustrated in FIGS. 1 and 2. The depicted system includes a multi-channel audio source 302, such as audio decoder 207, that sends encoded audio data right and left audio channel sources 304 and 306 such as may be incorporated within stereo controller 208. The decoded and separated right and left channel signals are respectively sent from right and left channel sources 304 and 306 to a channel switch controller 308 which may be incorporated within stereo controller 208. Channel switch controller 308 determines which of the right and left channel inputs are sent to a right channel audio output 310 and a left channel audio output 312. In default mode, for example, channel switch controller 308 directs input from the right channel source 304 to right channel audio output 310 and directs input from the left channel source 306 to left channel audio output 312.

Channel switch controller 308 may utilize input from an orientation detector 315 to determine different configurations for outputting signals to right and left channel audio outputs 310 and 312. In the depicted embodiment, orientation detector 315 comprises an audio signature detector 314 that receives audio signal input 316 such as from a microphone. As explained with reference to FIGS. 1 and 2, the audio signal input 316 may include audio signals generated by a microphone from combined sounds received from system-designated right and left speakers. The combined audio input 316 is processed by audio signature detector 314 to detect one or more audio signatures associated with the audio signals.

Audio signal detector 314 separates and outputs audio signal components corresponding to the audio signatures to a sound metric detector 318 which detects the strengths (e.g., signal amplitudes) and/or the frequencies of the audio signal components. Orientation detector 315 further comprises a correlation analyzer 320 that receives input from sound metric detector 318 and a motion sensor 322. As described with reference to FIGS. 1 and 2, motion sensor 322 may be fixed coupled to or otherwise integrated with an audio source device that includes orientation detector 315. Motion sensor 322 may be, for example, an accelerometer that detects directional acceleration of the audio source device and sends resultant motion data to correlation analyzer 320.

Figure 4A:
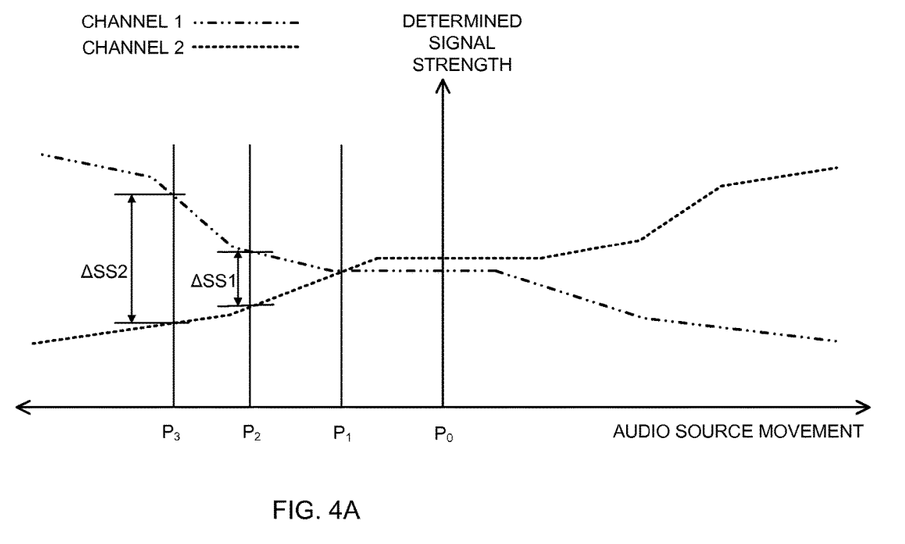
FIG. 4A is a graph depicting speaker orientation detection in accordance with an embodiment.
Figure 4B:
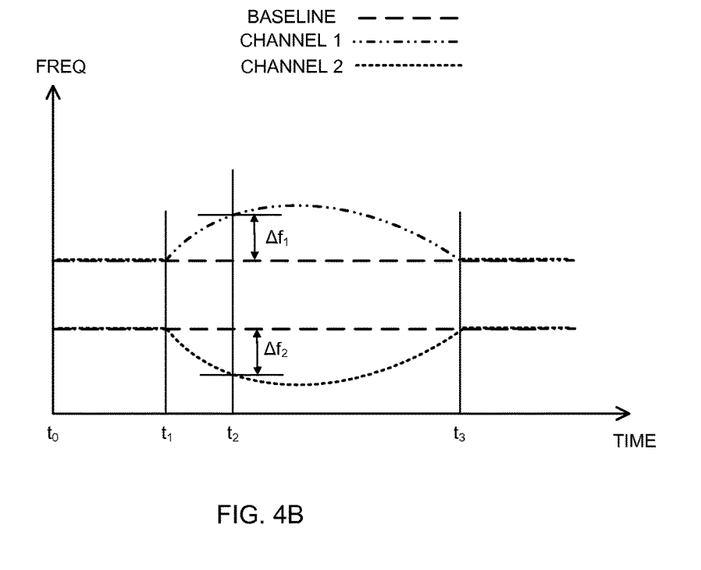
FIG. 4B is a graph depicting speaker orientation detection in accordance with an embodiment.

In one embodiment, and as illustrated in FIGS. 4A and 4B in conjunction with FIG. 3, correlation analyzer 320 uses right and left channel recognition in combination with motion detection to determine a relative orientation of system-designated right and left speakers. FIG. 4A depicts speaker orientation detection in accordance with an embodiment in which a combined relative variation between the signal strengths of Channels 1 and 2 (corresponding to the right and left channels, or vice versa) is used in combination with motion detection to determine relative orientation of the right and left speakers. In the graph shown in FIG. 4A, the vertical axis represents signal strength magnitude that varies over movement/position which is depicted by position points $P_0$-$P_3$ on the horizontal axis. It should be noted that the horizontal axis represents a continuum of substantially lateral positions over which the audio source device may be moved in front and from the perspective of a user holding the device while wearing system-designated right and left earpieces.

At each of positions $P_0$-$P_3$ correlation analyzer 320 receives from signal strength detector signal strength indications corresponding to respective, distinct audio signatures. Correlation analyzer 320 receives and utilizes multi-channel audio input data from audio source 302 to associate each of the audio signatures, represented as Channels 1 and 2, with the right or the left stereo channels of the multi-channel audio signal. Having associated the audio signatures and corresponding signal strengths with the right and left channels (e.g., Channel 1 signature associated with the right channel and Channel 2 with the left channel), correlation analyzer 320 may track variations in the signal strengths to determine how the right and left channel signal strengths vary in accordance with movement of the audio source device.

At an initial position, represented as $P_0$, the Channel 1 signal strength is determined by correlation analyzer 320 to be slightly greater that the Channel 2 signal strength by a marginal delta. As the audio source device is moved laterally leftward, such as via right-to-left carrying-hand motion of the user, to position $P_1$, correlation analyzer 320 receives an indication of the motion including relative direction as detected by motion sensor 322. In response to receiving indication of the detected motion, correlation analyzer 320 detects a variation in the signal strength gap between Channels 1 and 2. At position $P_1$, for example, correlation analyzer 320 detects that the Channel 2 strength has decreased so that no measurable gap remains between the channels. As the leftward motion continues, the Channel 1 signal strength increases and the Channel 2 signal strength continues to decrease until at position $P_2$, correlation analyzer 320 detects that the gap between Channels 1 and 2 has reached threshold $\Delta SS1$ in response to which a speaker/channel orientation determination can be made. Correlation analyzer 320 may correlate the detected motion with the detected signal strength gap threshold, $\Delta SS1$, to determine whether speaker/channel orientation can be correctly confirmed.

In one embodiment, the distance and/or direction of motion, in combination with the time over which the displacement occurs may not be optimal to qualify the $\Delta SS1$ threshold as triggering an orientation determination. In such a case, the leftward motion of the audio source device may continue until at position $P_3$ the signal strength gap reaches a second threshold $\Delta SS2$ at which point correlation analyzer 320 correlates the signal strength gap with the detected motion (e.g., leftward direction over a distance between point $P_0$ to point $P_3$) to determine whether the channels/speakers are correctly oriented. For example, if Channel 1 is identified as the system-designated right channel and Channel 2 the left channel, correlation analyzer 320 may determine that the speakers are incorrectly oriented in response to detecting that the right speaker volume (translated from the right channel signal strength) is increasing while the left speaker volume (translated from the left channel signal strength) is decreasing as the sound sensing audio source device is moved in a leftward direction. The orientation detection mechanism may or may not require volume of one channel to increase while the other decreases. Since received sound volume is inversely proportional to the square of the distance to the source, as the microphone continues moving left it may detect that the volume received from the nearer (left) speaker is varying (increasing or decreasing) at a higher rate than the rate of change in the volume received from the further (right) speaker.

In an alternate embodiment, correlation analyzer 320 may receive frequency information from sound metric detector 318 and detect changes in frequency compared to the baseline audio source to determine speaker orientation. Due to movement of the speakers relative to the microphone the received, the resultant audio signal will be modified by Doppler frequency shifting. The variations in frequency can then be combined with the movement of the audio source device to estimate relative orientation of the speakers. FIG. 4B depicts speaker orientation detection in accordance with an embodiment in which individual or combined frequency variations of the signals represented as Channels 1 and 2 are used in combination with motion detection to determine relative orientation of the right and left speakers. In the graph shown in FIG. 4B, the vertical axis represents frequency, such as in Hz or kHz, that is originally established by a baseline, multi-channel signal and the horizontal axis represents a time continuum over which the audio source device is intermittently moved in a direction. The baseline signal frequency, BASELINE, is depicted as constant over time for simplicity of illustration.

From time $t_0$ to time $t_1$, correlation analyzer 320 receives indication that the frequencies of the identified CHANNELs 1 and 2 are substantially the same as their respective baseline frequencies. This may indicate only slow relative motion, if any, between the audio source device and the speakers. From time $t_1$ to time $t_2$, the frequencies of CHANNELs 1 and 2 begin to diverge from their baselines, indicating relatively fast relative motion between the audio source device and the speakers. As shown at $t_2$, the CHANNEL 1 frequency has increased above its baseline by a threshold, $\Delta f_1$, indicating that the audio source is moving toward the speaker corresponding to CHANNEL 1. Also at $t_2$, the CHANNEL 2 frequency has decreased below its baseline by a threshold, $\Delta f_2$, indicating that the audio source is moving away from the speaker corresponding to CHANNEL 2. Correlation analyzer 320 may correlate the channel frequency variations with the detected direction of motion to determine whether the speakers are correctly oriented.

Figure 5:
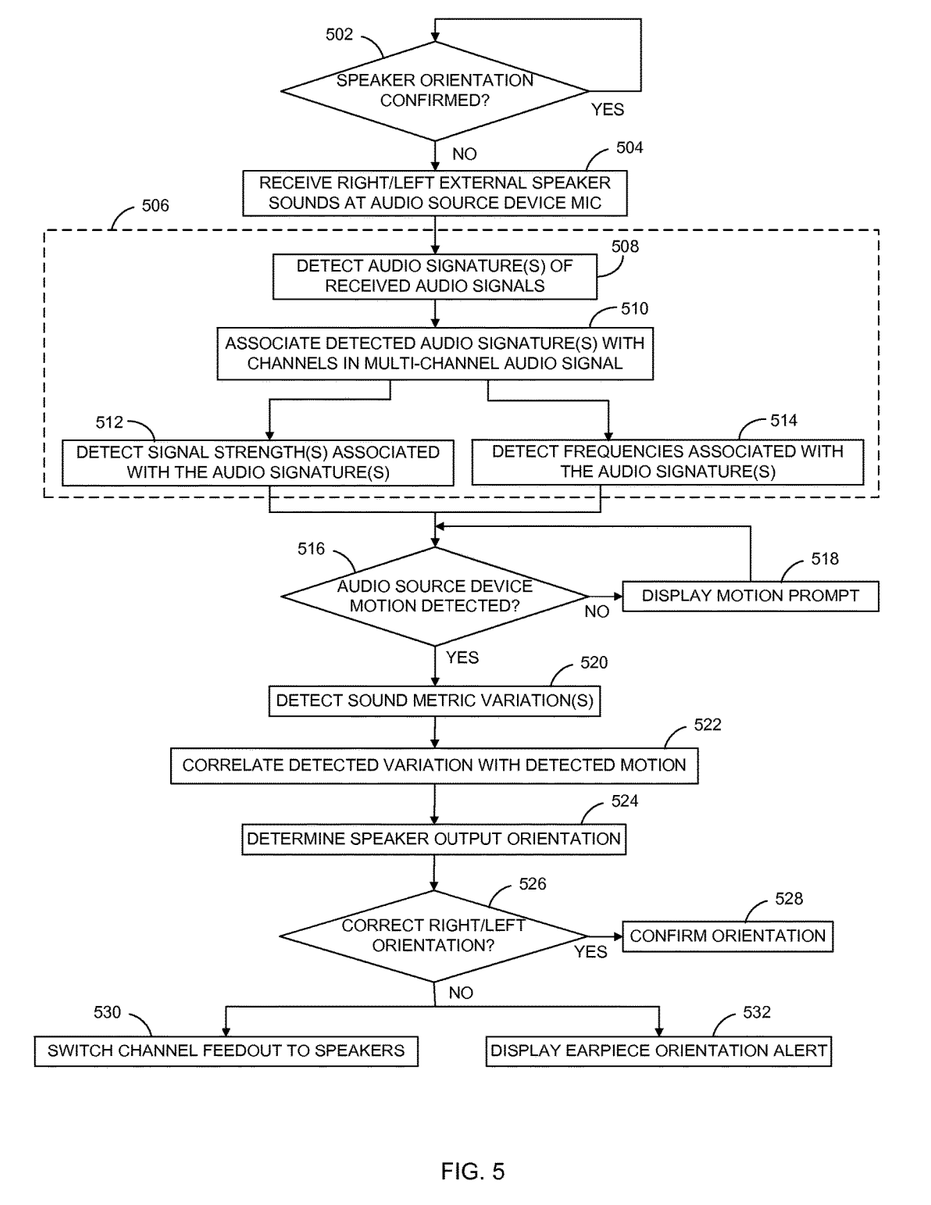
FIG. 5 is a flow diagram illustrating speaker orientation detection in accordance with an embodiment.

FIG. 5 is a flow diagram illustrating functions and operations performed by devices and components such as those depicted in FIGS. 1-3 during speaker orientation detection in accordance with an embodiment. The process begins as depicted at step 502 with a determination of whether right/left speaker orientation has been previously determined and confirmed. If not, the orientation determination cycle commences as shown at step 504 with a sound sensor simultaneously receiving sounds signals from a first speaker and a second speaker. In one embodiment, the sound sensor is a microphone that is coupled to an audio source device such as a smartphone that generates the sends audio signals to the speakers.

As depicted at step 506, the audio source device determines a baseline sound metric (either or both volume and frequency) from one or both of the speakers by identifying which sounds correspond to a system-designated right channel, which sounds correspond to a system-designated left channel, and associating signal strengths with each. The baseline volume determination begins at step 508 with the audio source device detecting respective audio signatures of each of sounds generated by the right and left speakers. The audio device then associates the audio signatures with the audio source device's right and left output audio channels as shown at step 510. As depicted at steps 512 and 514, the audio source device may detect either or both the volumes and/or the frequencies of the signals corresponding to the audio signatures.

Proceeding to steps 516 and 518, the audio source device may display a message to prompt a user to move the device (e.g., left to right) if sufficient motion is not detected. In response to detecting movement, the audio source device commences detecting variations in the volume and/or frequency metrics from the speakers (step 520). As explained with reference to FIGS. 3 and 4, speaker volume variation may be detected by tracking changes in the respective channels' signal strengths associated with the audio signatures. The audio device correlates the detected variations in the determined sound metric(s) with the detected motion of the audio device (step 522) to determine whether the speakers (e.g., system-designated right/left) are correctly oriented (step 524). For example, the audio device may determine that the speakers are correctly oriented in response to a correlation at step 522 indicating an increase in right channel signal strength as the audio device moves in a rightward direction.

The process may conclude with orientation confirmation or correction steps. For example, if the speaker orientation is confirmed to be correct the audio source device may register the confirmation result (steps 526 and 528) to avoid continuous repetition of the process. If the speaker orientation is determined to be incorrect, the audio source device may switch the right/left channel feedout to the speakers (step 530) and/or may display a corresponding alert message to the user (step 532).

Figure 6:
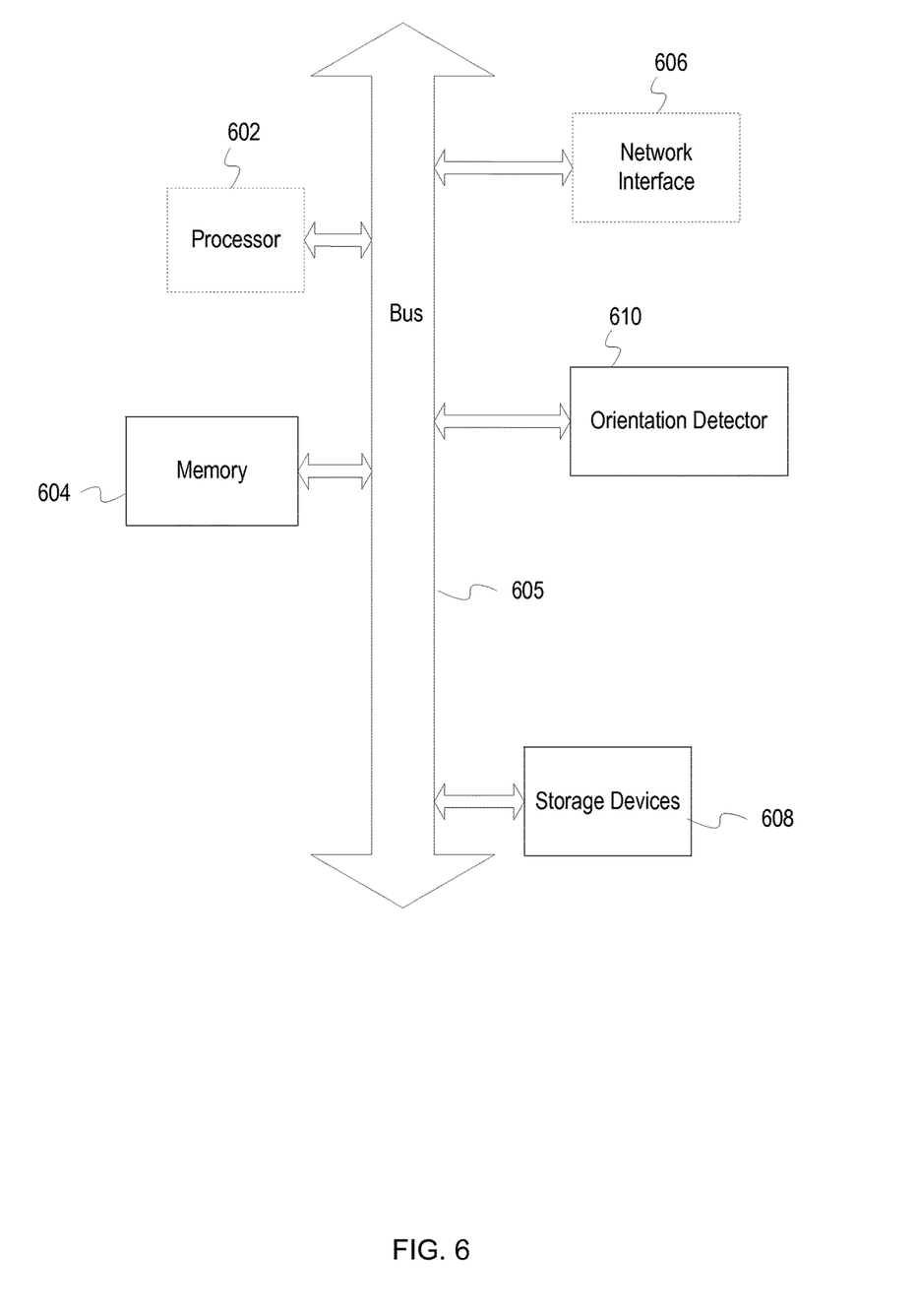
FIG. 6 is a block diagram of a computer system for performing the functions described and depicted with reference to FIGS. 1-5.

FIG. 6 depicts an example computer system that includes an orientation detector 610. The computer system includes a processor 602 (possibly including multiple processors, multiple cores, multiple nodes, and/or implementing multi-threading, etc.). The computer system includes memory 604 which may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes an interconnect 605 (e.g., PCI, ISA, PCI-Express, HyperTransport®, InfiniBand®, NuBus, etc.), a network interface 606 (e.g., an Ethernet interface, a Frame Relay interface, SONET interface, wireless interface, etc.), and a storage device(s) 608 (e.g., optical storage, magnetic storage, etc.). Token management unit 610 embodies functionality to implement features described above with reference to FIGS. 1-5. Orientation detector 610 may perform operations for receiving and processing transaction tokens and token-associated validation parameters. Any one of these functionalities may be partially (or entirely) implemented in hardware and/or on processor 602. For example, the functionality may be implemented with an application specific integrated circuit, in logic implemented in processor 602, in a co-processor on a peripheral device or card, etc. Further, realizations may include fewer or additional components not illustrated in FIG. 6 (e.g., additional network interfaces, peripheral devices, etc.).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

What is claimed is:

1. A method for determining a relative orientation of system-designated right and left speakers in a pair of earpieces that receive audio signals from a portable audio source device that processes multi-channel audio having, at least, a designated right channel and a designated left channel, said method comprising:
  receiving, by a sound sensor that is coupled with the portable audio source device, a first sound from the system-designated right speaker and a second sound from the system-designated left speaker;
  determining a metric of at least one of the received first and second sounds, and wherein said determining the metric comprises:
  detecting an audio signature of at least one of the first and second sounds, wherein the audio signature is associated with a respective channel of the multi-channel audio signal processed by the portable audio source device, and
  detecting at least one of a signal strength and frequency information associated with the audio signature;
  detecting a variation in the determined metric in the respective channel associated with the audio signature;
  detecting a direction of motion of the portable audio source device;
  determining a relative orientation of the system-designated right and left speakers with respect to a left side and right side of a user of the portable audio source device based, at least, on correlating the detected direction of motion with the detected variation in the determined metric; and
  outputting the designated right channel by a speaker of the system-designated right and left speakers oriented on the right side of the user, and outputting the designated left channel by a speaker of the system-designated right and left sneakers oriented on the left side of the user.

2. The method of claim 1, wherein said detecting direction of motion comprises detecting a direction of motion based, at least in part, on output of one or more accelerometers of the portable audio source device.

3. The method of claim 1, wherein said detecting a direction of motion comprises detecting a change in position of the portable audio source device.

4. The method of claim 1, wherein said determining the relative orientation of the system-designated right speaker and the system-designated left speaker comprises determining a relative lateral arrangement of the system-designated right speaker and the system-designated left speaker with respect to the portable audio source device.

5. The method of claim 1, wherein said detecting a variation in the determined metric is performed in response to said detecting a direction of motion of the portable audio source device.

6. A system for determining a relative orientation of system-designated right and left speakers in a pair of earpieces that receive audio signals from a portable audio source device that processes multi-channel audio having, at least, a designated right channel and a designated left channel, said system comprising:
  a sound sensor that is coupled with the portable audio source device and receives a first sound from the system-designated right speaker and a second sound from the system-designated left speaker;
  a sound metric detector configured to determine a metric of at least one of the received first and second sounds, wherein said determination of the metric comprises:
  detecting an audio signature of at least one of the first and second sounds, wherein the audio signature is associated with a respective channel of the multi-channel audio signal processed by the portable audio source device, and
  detecting at least one of a signal strength and frequency information associated with the audio signature, and
  detecting a variation in the determined metric in the respective channel associated with the audio signature;
  a motion sensor integrated with the sound sensor, wherein the motion sensor detects a direction of motion of the portable audio source device;
  a correlation analyzer that determines a relative orientation of the system-designated right and left speakers with respect to a left side and right side of a user of the portable audio source device based, at least, on correlating the detected direction of motion with the detected variation in the determined metric; and
  a channel switch controller that outputs the designated right channel by a speaker of the system-designated right and left speakers oriented on the right side of the user, and outputs the designated left channel by a speaker of the system-designated right and left speakers oriented on the left side of the user.

7. The system of claim 6, wherein said motion detector is an accelerometer that detects the direction of motion of the portable audio source device.

8. The system of claim 6, wherein said correlation analyzer determines a relative lateral arrangement of the system-designated right speaker and the system-designated left speaker with respect to the portable audio source device.

9. The system of claim 6, wherein said sound metric detector detects a variation in the determined metric in response to detecting a direction of motion of the portable audio source device.

10. A computer program product for determining a relative orientation of system-designated right and left speakers in a pair of earpieces that receive audio signals from a portable audio source device that processes multi-channel audio having, at least, a designated right channel and a designated left channel, said computer program product comprising:
  a computer readable storage medium that does not include signals, the computer readable storage medium having program instructions embodied therewith, the program instructions comprising program instruction to,
  receive, by a sound sensor that is coupled with the portable audio source device, a first sound from the system-designated right speaker and a second sound from the system-designated left speaker;
  determine a metric of at least one of the received first and second sounds, and wherein said determining the metric comprises:
  detect an audio signature of at least one of the first and second sounds, wherein the audio signature is associated with a respective channel of the multi-channel audio signal processed by the portable audio source device, and detect at least one of a signal strength and frequency information associated with the audio signature;

detect a variation in the determined metric in the respective channel associated with the audio signature;

detect a direction of motion of the portable audio source device;

determine a relative orientation of the system-designated right and left speakers with respect to a left side and right side of a user of the portable audio source device based, at least, on correlating the detected direction of motion with the detected variation in the determined metric; and output the designated right channel by a speaker of the system-designated right and left speakers oriented on the right side of the user, and output the designated left channel by a speaker of the system-designated right and left speakers oriented on the left side of the user.

11. The computer program product of claim 10, wherein the program instructions to determine the relative orientation of the system-designated right speaker and the system-designated left speaker comprise program instructions to determine a relative lateral arrangement of the system-designated right speaker and the system-designated left speaker with respect to the portable audio source device.

* * * * *